United States Patent
Sugeerappa et al.

(10) Patent No.: US 10,891,276 B2
(45) Date of Patent: Jan. 12, 2021

(54) ENFORCING REFERENTIAL INTEGRITY FOR DATABASE COLUMNS

(71) Applicant: FMR LLC, Boston, MA (US)

(72) Inventors: Basavaraja Sugeerappa, Hopkinton, MA (US); Swarupa Kummitha, Bangalore (IN); Kishan P. Shetty, Bangalore (IN); Sameer Pitke, Cumberland, RI (US); Rajendra Sripada, Lincoln, RI (US)

(73) Assignee: FMR LLC, Boston, MA (US)

( * ) Notice: Subject to any disclaimer, the term of this patent is extended or adjusted under 35 U.S.C. 154(b) by 207 days.

(21) Appl. No.: 16/016,417

(22) Filed: Jun. 22, 2018

(65) Prior Publication Data

US 2019/0392056 A1 Dec. 26, 2019

(51) Int. Cl.
*G06F 16/215* (2019.01)

(52) U.S. Cl.
CPC .................. *G06F 16/215* (2019.01)

(58) Field of Classification Search
CPC .................................................. G06F 16/215
See application file for complete search history.

(56) References Cited

U.S. PATENT DOCUMENTS

| | | | |
|---|---|---|---|
| 5,553,218 A | 9/1996 | Li et al. | |
| 8,065,323 B2 | 11/2011 | Sallakonda et al. | |
| 9,721,009 B2 | 8/2017 | Trivedi et al. | |
| 2002/0147725 A1* | 10/2002 | Janssen | G06F 16/221 |
| 2003/0172368 A1* | 9/2003 | Alumbaugh | G06F 8/71 717/106 |
| 2010/0228764 A1* | 9/2010 | Sallakonda | G06F 16/24565 707/769 |
| 2013/0262403 A1* | 10/2013 | Milousheff | G06F 16/2365 707/691 |
| 2014/0279934 A1 | 9/2014 | Li et al. | |

OTHER PUBLICATIONS

Blaha, M. Primary Key and Foreign Key Errors to Avoid. dataversity. net. Sep. 2, 2015. pp. 1-7. (Year: 2015).*
SQL Tutorial, firstsql.com. pp. 1-16. (Year: 2017).*
PostgreSQL Tutorial: PostgreSQL Character Types: CHAR, VARCHAR, and TEXT. www.postgresqltutorial.com, Nov. 20, 2016. pp. 1-5. (Year: 2016).*
Getting started with SQL Server, msdn.microsoft.com. Feb. 3, 2014, pp. 1-7. (Year: 2014).*
Present your data in a scatter chart or a line chart. Microsoft Office Support for Excel 2010, pp. 1-4. (Year: 2010).*

* cited by examiner

*Primary Examiner* — Alex Gofman
*Assistant Examiner* — Shelly X Qian
(74) *Attorney, Agent, or Firm* — Proskauer Rose LLP

(57) ABSTRACT

Methods and apparatuses are described for enforcing referential integrity of database columns across a plurality of tables in a database. A server periodically captures a database schema comprising relationships between a primary key column in a first table and a foreign key column in a second table. The server executes a first procedure call to determine a discrepancy between the primary key column and the foreign key column with respect to a data length value or a data type value. The server executes database queries against data in the first table or second table to confirm the discrepancy. The server executes a second procedure call to change the data length value or the data type value. After the second procedure call finishes, the data length value and the data type value of the primary key column and the foreign key column match.

26 Claims, 6 Drawing Sheets

Employee Table 102

| EmployeeID (PK) | Name | Title |
|---|---|---|
| ✓ A1234 | John Doe | Sr. Project Manager |
| A654321 | Jane Doe | Tech Lead |

Product Table 104

| Product ID | EmployeeID (FK) |
|---|---|
| ✓ KJ0551 | ✓ A1234 |
| KJ7342 | A654321 |

FIG. 3 (prior art)

ENFORCING REFERENTIAL INTEGRITY FOR DATABASE COLUMNS

TECHNICAL FIELD

This application relates generally to methods and apparatuses, including computer program products, for enforcing referential integrity for database columns across a plurality of tables in a database.

BACKGROUND

Many database software platforms are built upon a relational data paradigm, where items of information are stored in tables that may be linked by defined relationships. In relational databases and flat file databases, a table is a set of data elements (values) using a model of vertical columns (that are identifiable by name) and horizontal rows, the cell being the unit where a row and column intersect. A table has a specified number of columns, but can have any number of rows.

Typically, each row in a table is associated with a primary key (PK). The primary key can be defined as one column value, or a combination of column values, that uniquely identifies each row in the table. In most scenarios, the primary key is a single column—such as an identifier or identity column. Relational databases also incorporate the concept of a foreign key (FK). A foreign key is a column, or combination of columns, in a table that provides a link between data in two tables. The foreign key acts as a cross-reference between two tables because the foreign key references the primary key of another table.

FIG. 1 is an example of a primary key-foreign key relationship between two tables in a relational database. As shown in FIG. 1, the EmployeeID field 102a in the Employee table 102 is a primary key that uniquely identifies each row in the table. The Employee table 102 also includes fields such as Name and Title for each row. Similarly, the ProductID field 104a in the Product table 104 is a primary key that uniquely identifies each row in the table. An EmployeeID from the Employee table is in each row of the Product table (104b), to serve as a foreign key establishing the relationship between the two tables (as represented by the arrow 106).

Relational databases are also built upon the concept of referential integrity, meaning that relationships between tables should always be consistent. In other words, any foreign key field must be compliant with the primary key that it references such that each value of one attribute (column) of a relation (table) exists as a value of another attribute (column) in a different relation (table).

Current generation relational database platforms enforce referential integrity from a data value perspective. As an example, a relational database platform may prevent new rows from being inserted into a table with a foreign key unless the value in the foreign key column corresponds to a value of a primary key in the related table. However, such relational database platforms do not enforce data length and/or data type constraints on primary key-foreign key relationships. FIG. 2 is an exemplary database schema for the tables provided in FIG. 1. As shown in FIG. 2, the database schema defines the EmployeeID field 102a (primary key) in the Employee Table 102 as having a length of 7 characters, while the corresponding EmployeeID field 104b (foreign key) in the Product Table 104 is defined as having a length of 5 characters. Therefore, in this example, data values for EmployeeID in the Employee table are allowed to be longer than data values for EmployeeID in the Product table.

As a result, over time this difference in data length can give rise to significant technical problems. FIG. 3 depicts example data stored in the Employee table 102 and Product table 104 of FIG. 1. As shown in FIG. 3, the Employee table has two rows—one for EmployeeID 'A1234' and one for EmployeeID 'A654321'. Similarly, the Project table has two rows—each of which includes an EmployeeID from the Employee table as a foreign key. However, the EmployeeID 'A654321' has a data length of 7 characters—which is acceptable under the definition for EmployeeID in the Employee table, but is too long for the EmployeeID field in the Product table (see FIG. 2). In this instance, the database platform would be unable to insert the necessary data into the Product table, even though that data could be successfully inserted into the Employee table. Such a conflict between data fields could result in system errors or outages for critical production systems—or even system failure.

SUMMARY

Therefore, what is needed are methods and systems for enforcing referential integrity for database columns across a plurality of tables in a database, specifically in the context of ensuring that column metadata (i.e., data type, data length) remains consistent across columns in a primary key-foreign key relationship. The techniques described herein provide the technical advantage of automatically and periodically capturing and analyzing database schema that define tables and relationships in a database system, to determine the existence of data type or data length discrepancies. The techniques also enable seamless remediation of such discrepancies by computing devices that execute procedure calls against the database schema, and the data in the affected database tables, to make the table definitions consistent.

The invention, in one aspect, features a system for enforcing referential integrity of database columns across a plurality of tables in a database. The system comprises a server computing device including a memory for storing programmatic instructions and a processor for executing the programmatic instructions. The system also includes a database coupled to the server computing device. The server computing device executes the programmatic instructions to periodically capture a database schema associated with the database, the database schema comprising one or more relationships between a primary key column in a first table in the database and a foreign key column in a second table in the database. The server computing devices executes a first procedure call against the database schema to determine a discrepancy between the primary key column and the foreign key column with respect to one or more of: a data length value or a data type value. The server computing device executes one or more database queries against data in one or more of: the first table or the second table to confirm the discrepancy. The server computing device executes a second procedure call against the database schema to eliminate the discrepancy, wherein the second procedure call changes one or more of: (i) the data length value of the primary key column, (ii) the data length value of the foreign key column, (iii) the data type value of the primary key column, or (iv) the data type value of the foreign key column. After the second procedure call finishes, the data length value of the primary key column matches the data length value of the foreign key column, and the data type value of the primary key column matches the data type value of the foreign key column.

The invention, in another aspect, features a computerized method of enforcing referential integrity of database columns across a plurality of tables in a database. A server computing device periodically captures a database schema associated with a database coupled to the server computing device, the database schema comprising one or more relationships between a primary key column in a first table in the database and a foreign key column in a second table in the database. The server computing device executes a first procedure call against the database schema to determine a discrepancy between the primary key column and the foreign key column with respect to one or more of: a data length value or a data type value. The server computing device executes one or more database queries against data in one or more of: the first table or the second table to confirm the discrepancy. The server computing device executes a second procedure call against the database schema to eliminate the discrepancy, wherein the second procedure call changes one or more of: (i) the data length value of the primary key column, (ii) the data length value of the foreign key column, (iii) the data type value of the primary key column, or (iv) the data type value of the foreign key column. After the second procedure call finishes, the data length value of the primary key column matches the data length value of the foreign key column, and the data type value of the primary key column matches the data type value of the foreign key column.

Any of the above aspects can include one or more of the following features. In some embodiments, upon execution of the first procedure call, the server computing device determines that the data length value of the primary key column is less than the data length value of the foreign key column. In some embodiments, upon execution of the first procedure call, the server computing device determines that the data length value of the primary key column is greater than the data length value of the foreign key column. In some embodiments, upon execution of the first procedure call, the server computing device determines that the data type value of the primary key column is different from the data type value of the foreign key column.

In some embodiments, the server computing device executes the one or more database queries to insert temporary data in one or more of: the first table or the second table. In some embodiments, a data length value of the temporary data is greater than the data length value of one or more of: the data length value of the primary key column or the data length value of the foreign key column. In some embodiments, the database returns an insertion error to the server computing device after execution of the one or more database queries. In some embodiments, a data type value of the temporary data is different from one or more of: the data type value of the primary key column or the data type value of the foreign key column. In some embodiments, the database returns an insertion error to the server computing device after execution of the one or more database queries.

In some embodiments, the data length value of the primary key column is a string length value or a number length value. In some embodiments, the data type value of the primary key column is a string or a number. In some embodiments, the data length value of the foreign key column is a string length value or a number length value. In some embodiments, the data type value of the foreign key column is a string or a number. In some embodiments, the server computing device generates a visual representation of the changed database schema resulting from the second procedure call and displays the visual representation on a remote device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 depicts example data stored in the tables provided in FIG. 1.

DETAILED DESCRIPTION

Figure 4:
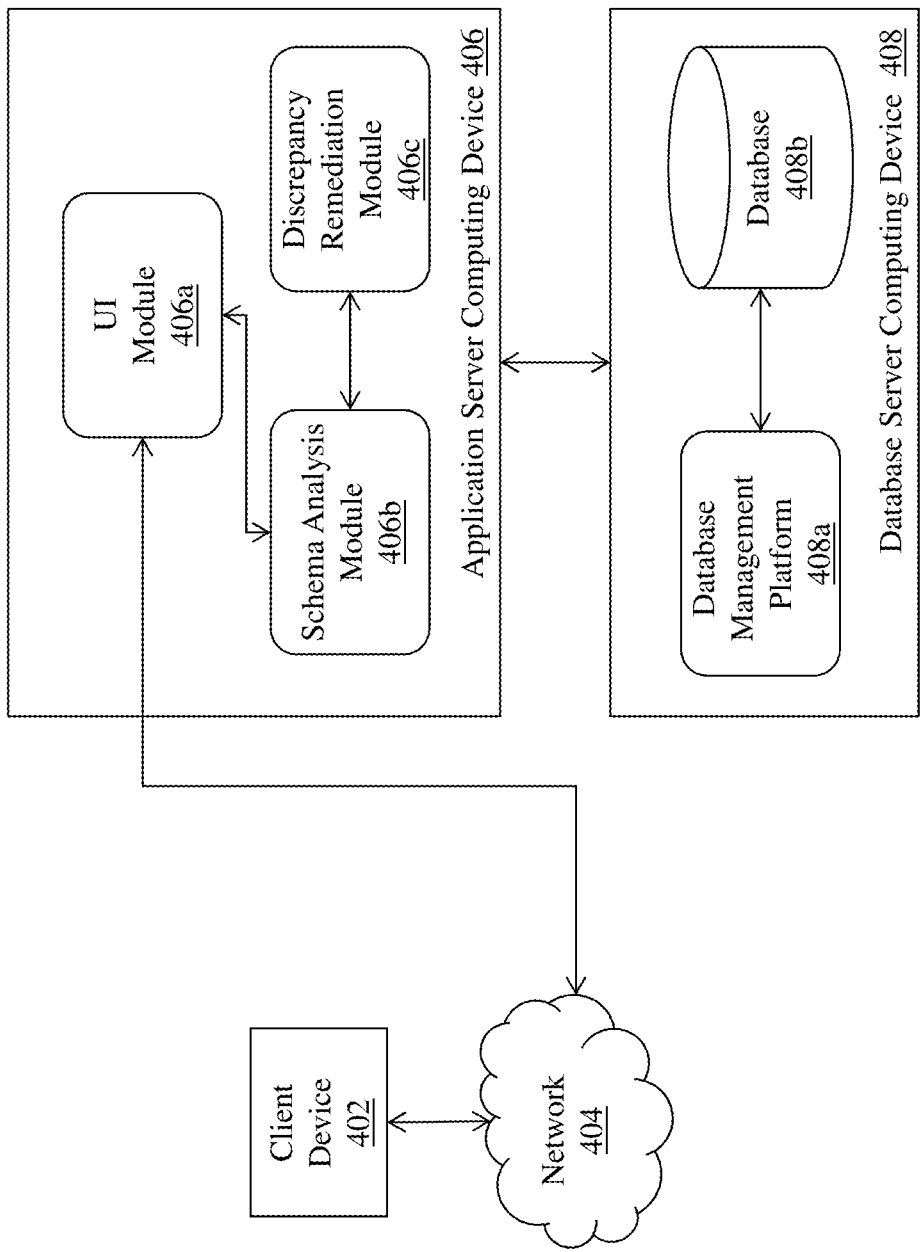
FIG. 4 is a block diagram of a system for enforcing referential integrity of database columns across a plurality of tables in a database.

FIG. 4 is a block diagram of a system 400 for enforcing referential integrity of database columns across a plurality of tables in a database. The system 400 includes a client computing device 402 that is coupled via communications network 404 to an application server computing device 406. The application server computing device 406 includes a user interface (UI) module 406a, a schema analysis module 406b, and a discrepancy remediation module 406c. The application server computing device 406 is coupled to a database server computing device 408, which includes a database management platform 408a and a database 408b.

Exemplary client computing devices 402 include, but are not limited to, tablets, smartphones, laptops, desktops, and other computing devices. It should be appreciated that other types of client computing devices that are capable of connecting to the components of the system 400 can be used without departing from the scope of invention. Although FIG. 4 depicts a single client computing device 402, it should be appreciated that the system 400 can include any number of client computing devices.

The client computing device 402 can execute software applications, such as browser applications. In some embodiments, a browser application comprises software executing on a processor of the client computing device 402 that enables the device to communicate via HTTP or HTTPS with remote servers addressable with URLs (e.g., application server 406) to receive website-related content, including one or more webpages, for rendering in the browser application and presentation on a display device embedded in or coupled to the client computing device. 402 Exemplary mobile browser application software includes, but is not limited to, Firefox™, Chrome™, Safari™, and other similar software. The one or more webpages can comprise visual and audio content for display to and interaction with a user, that contain data relating to the process of enforcing referential integrity of database columns across a plurality of tables in a database, as described herein.

The system 400 also includes an application server 406 (e.g., a computing device or devices) that hosts a website, service, or other remote application, to which the client computing device 402 can connect to retrieve and display application content. The application server 406 is a combination of hardware, including one or more special-purpose processors and one or more physical memory modules, and specialized software modules including modules 406a, 406b, and 406c that are executed by a processor of the application server 406. Typically, a website comprises a plurality of visual and non-visual elements that make up content transmitted and displayed to a user when, e.g., browser software on the client computing device 402 connects to the application server 406 via communications network 404 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video).

A user at client computing device 402 may establish a communication session with the application server 406 via the network 404 for the purpose of viewing and interacting with data relating to the database management platform 408a and/or the database 408b (e.g., analyzing database tables, metadata, and schema, running queries against the database, etc.). To that end, the application server 406 includes a UI module 406a, a schema analysis module 406b, and a discrepancy remediation module 406c.

The modules 406a, 406b, and 406c are specialized sets of computer software instructions that can be programmed onto a dedicated processor in the application server 406 and can include specifically-designated memory locations and/or registers for executing the specialized computer software instructions. As will be described in greater detail below, the UI module 406a can generate display content (e.g., webpages) that are transmitted to the client computing device 402 for presentation to a user (e.g., via a browser). The user can provide input via the browser that is transmitted back to the UI module 406a for processing—for example, to generate different and/or additional content that displays data to the user.

The schema analysis module 406b communicates with the database management platform 408a of the database server 408 to retrieve database schema information about one or more databases (e.g., database 408b) managed by the platform 408a. For example, the schema analysis module 406b can instruct the database management to execute one or more scripts, procedure calls, or the like to generate a file that contains the database schema information for one or more tables in the database 408b (e.g., table names, columns, data types, data lengths, relationships to other tables, primary keys, foreign keys, indexes, etc.). In some embodiments, the generated file can be used by the UI module 406a to generate a visual representation of the database schema for display on the client computing device 402. The schema analysis module 406b also analyzes the data contained in the generated file to identify discrepancies between different tables in the database, as will be described in greater detail below.

The discrepancy remediation module 406c communicates with the schema analysis module 406b to receive the identified discrepancies, and converts the discrepancy information into programmatic instructions for changing the database schema for the affected tables in order to remedy the discrepancy. The discrepancy remediation module 406c can instruct the database management platform 408a to execute procedure calls against the database 408b that change, e.g., the definition of one or more columns in one or more tables so that the data lengths and/or data types of the columns are compliant. For example, as mentioned above, the module 406c can change the data length for a foreign key column in a table to match the data length of the related primary key column in another table. Other aspects of the functionality of the discrepancy remediation module 408c will be described in greater detail below.

The database server computing device 408 is a combination of hardware, including one or more special-purpose processors and one or more physical memory modules, and specialized software modules including database management platform 408a, that are executed by a processor of the database server 408. The database management platform 408a is a software module that enables initialization, configuration, and management of one or more relational databases (e.g., database 408b)—such as a relational database management system (RDBMS).

The database server 408 includes a database 408b that is configured to receive, generate, and store specific segments of data using a relational database paradigm, and which is controlled by the database management platform 408a. In some embodiments, all or a portion of the database 408b can be integrated with the database server 408 (as shown in FIG. 4) or be located on a separate computing device or devices. Although a single database 408b is shown in FIG. 4, it should be appreciated that the system 400 can comprise a plurality of databases (e.g., in a production computing system). Also, the database 408b can comprise one or more databases configured to store portions of data used by the other components of the system 400, as will be described in greater detail below.

Exemplary database management platforms 408a and corresponding databases 408b for use in the system 400 include, but are not limited to, Oracle Database 12c™ available from Oracle Corp.; MySQL™ available from Oracle Corp.; DB2™ available from IBM Corp.; and SQL Server™ available from Microsoft Corp.

Figure 5:
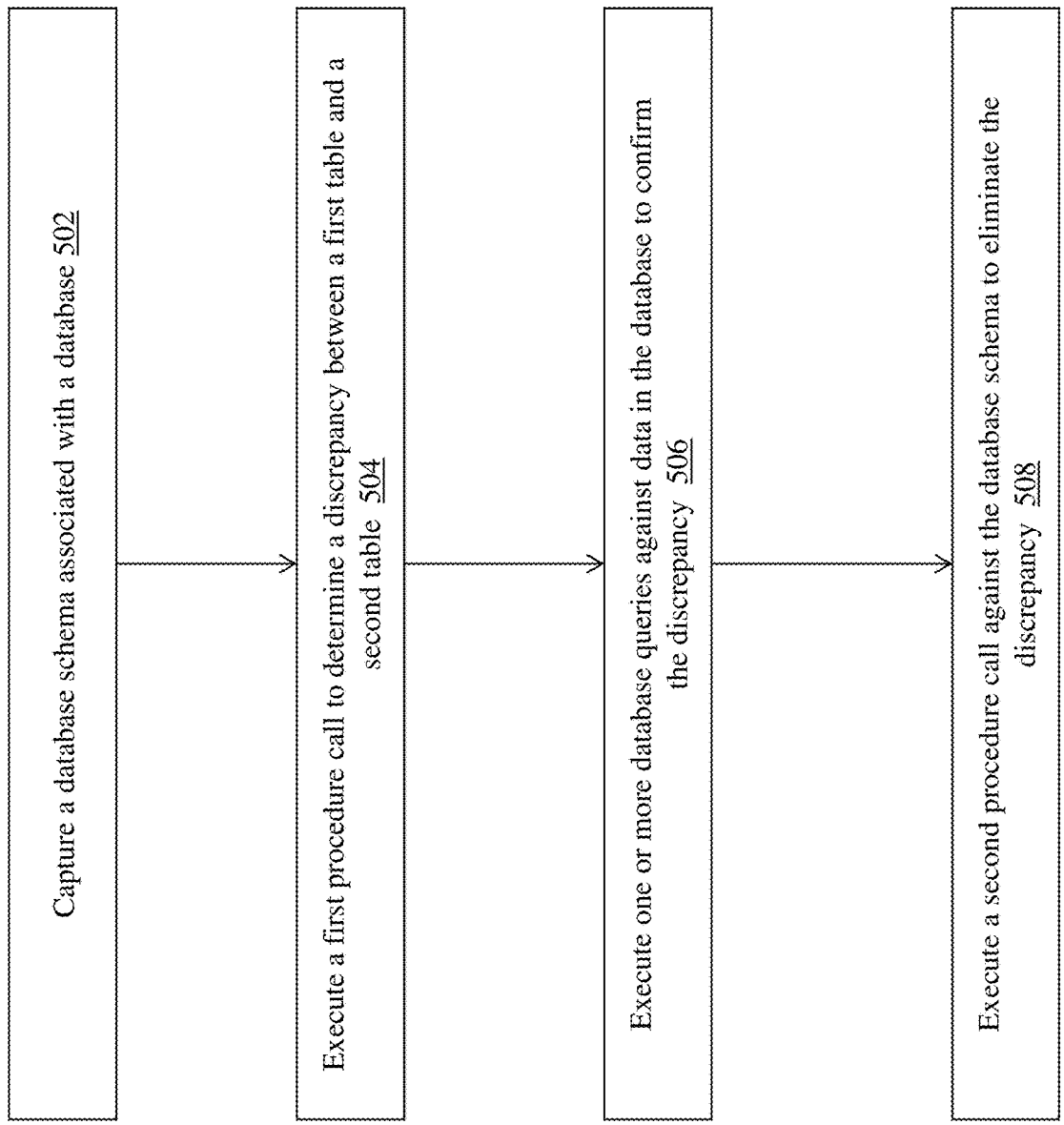
FIG. 5 is a flow diagram of a computerized method of enforcing referential integrity of database columns across a plurality of tables in a database.

FIG. 5 is a flow diagram of a computerized method 500 of enforcing referential integrity of database columns across a plurality of tables in a database, using the system 400 of FIG. 4. The schema analysis module 406b periodically captures (502) a database schema associated with the database 408b. As mentioned above, the database schema can comprise a file that contains information about the structure of the database tables within the database (e.g., names, columns, primary keys, foreign keys, relationships, indexes, and the like). Specifically, the database schema can contain information about one or more relationships between a primary key column in a first database table and a foreign key column in a second database table. In one embodiment, the schema analysis module 406b periodically requests and receives the database schema from the database management platform 408a. In another embodiment, the database management platform 408a executes a scheduled task or job that generates the database schema periodically and transmits the generated schema to the schema analysis module 406b.

Figure 2:
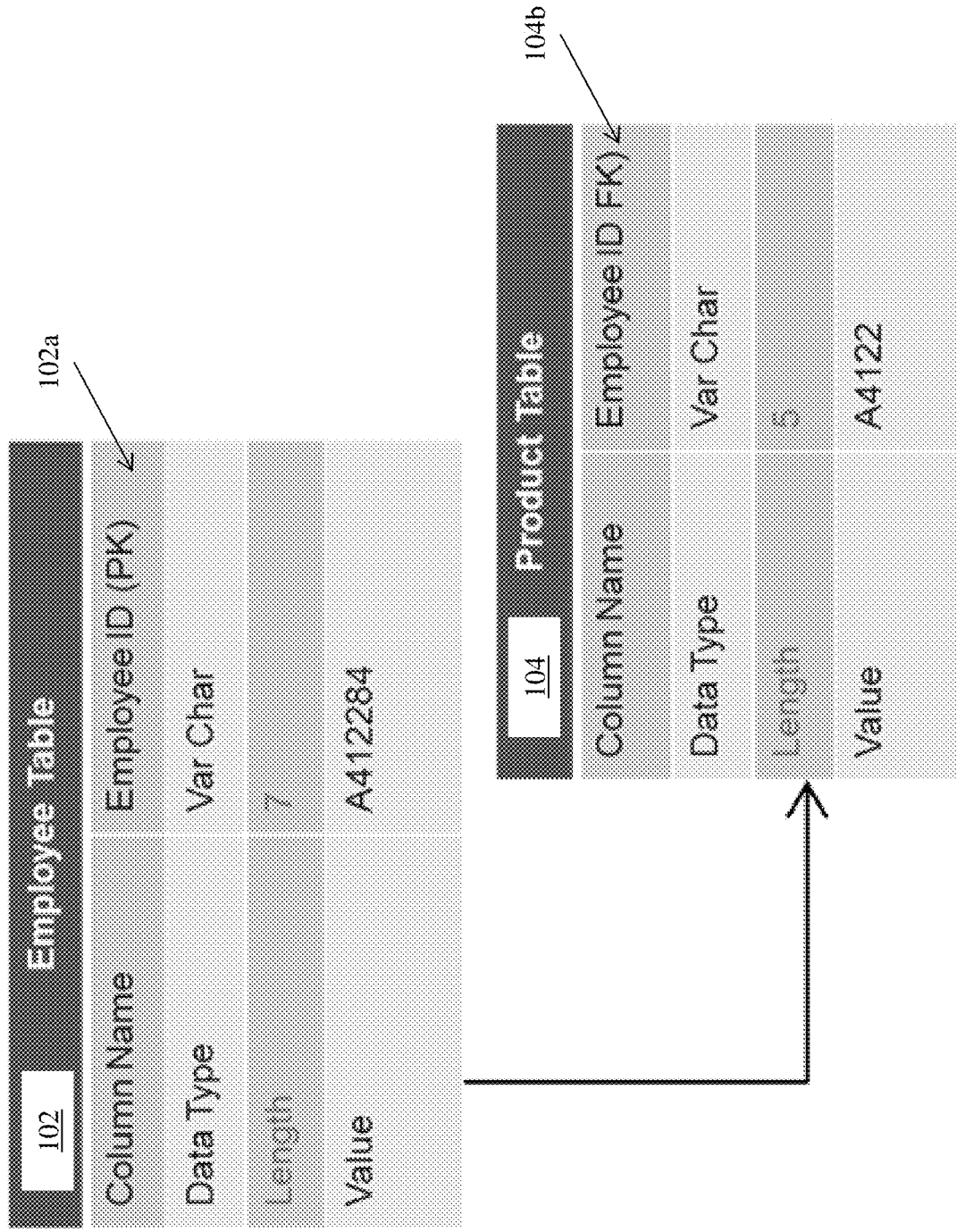
FIG. 2 is an exemplary database schema for the tables provided in FIG. 1.

The schema analysis module 406b executes (504) a first procedure call against the database schema received from the database management system 408a to determine a discrepancy between the primary key column of the first database table and the foreign key column of the second database table, with respect to one or more of a data length value or a data type value. For example, the module 406b can identify each of the primary key-foreign key relationships between each of the tables in the database 408b and compare the data length value and/or data type value of the columns in the respective tables to determine if there are any incompatibilities or mismatches. Using the example from FIG. 2, the schema analysis module 406b determines that the EmployeeID primary key 102a in the Employee table 102 has a data length value of 7, while the EmployeeID foreign key 104b in the Product table 104 has a data length value of 5. As a result, the schema analysis module 406b flags this relationship as containing a data length value discrepancy for remediation.

Once the schema analysis module 406b has identified discrepancies in the database schema, the schema analysis module 406b executes (506) one or more database queries against data in one or more of the first database table (e.g., the Employee table) or the second database table (e.g., the Product table) to confirm the existence of the discrepancy. In some embodiments, the schema analysis module 406b instructs the database management platform 408a to execute the one or more database queries locally and return the result set to the module 406b.

For example, the schema analysis module 406b can execute a query against the EmployeeID column in the Employee table to retrieve each EmployeeID value (or a count of such values) from the table that is greater than data length=5 (i.e., the data length value of the same column in the Product table). If the query executed by the module 406b returns a result set (indicating that there are some EmployeeID values in the table that are greater than 5, the schema analysis module 406b can confirm that the data in database 408b is reflective of the identified discrepancy.

In another example, the schema analysis module 406b can execute one or more queries against the Product table to attempt to insert one or more test values into the EmployeeID column to confirm that the discrepancy exists. For example, the schema analysis module 406b can execute an insertion query to instruct the database management platform 408a and/or the database 408b to insert an EmployeeID into the Product table that has a data length value greater than 5. Because the column is defined in the Product table as having a length=5, the database management platform 408a and/or the database 408b would be unable to insert the test data into the Product table and would return an insertion error message back to the schema analysis module 406b—thereby confirming the discrepancy.

The discrepancy remediation module 406c executes (508) a second procedure call against the database schema to eliminate the discrepancy, specifically by changing one or more of (i) the data length value of the primary key column; (ii) the data length value of the foreign key column; (iii) the data type value of the primary key column; or (iv) the data type value of the foreign key column. For example, the module 406c receives the discrepancy data from the schema analysis module 406b and determines that one or more of the above data elements should be changed in order to bring the primary key-foreign key relationship back into compliance. The module 406c executes a procedure call (or, in some embodiments, instructs the database management platform 408a to execute a procedure call) to programmatically change the database schema and/or other metadata (as defined in the platform 408a and/or the database 408b itself). The module 406c can, in a SQL example, perform an 'alter table' query that changes the column length for the EmployeeID foreign key column in the Product table to increase the length to 7, so that it matches the EmployeeID column length from the Employee table. In another example, if the data type of the primary key column does not match the data type of the foreign key column, the module 406c can perform an 'alter table' query that changes the column data type of the foreign key column to match the primary key column. In some instances, the module 406c can change both the data type value and the data length value of one or more columns to match. It should be appreciated that other methodologies and commands can be used by the discrepancy remediation module 406c and/or the database management platform 408a to change the structure of the database schema to remedy any identified discrepancies.

Figure 1:
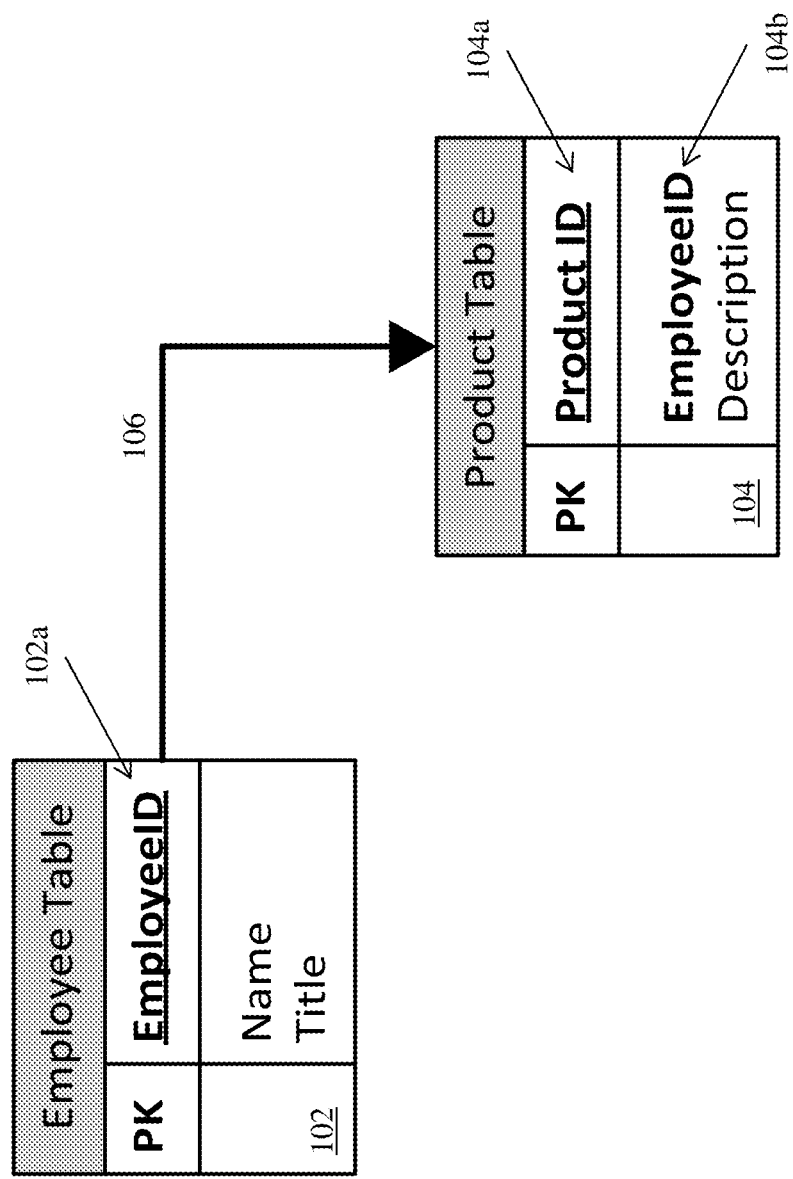
FIG. 1 is an example of a primary key-foreign key relationship between two tables in a relational database.
Figure 6:
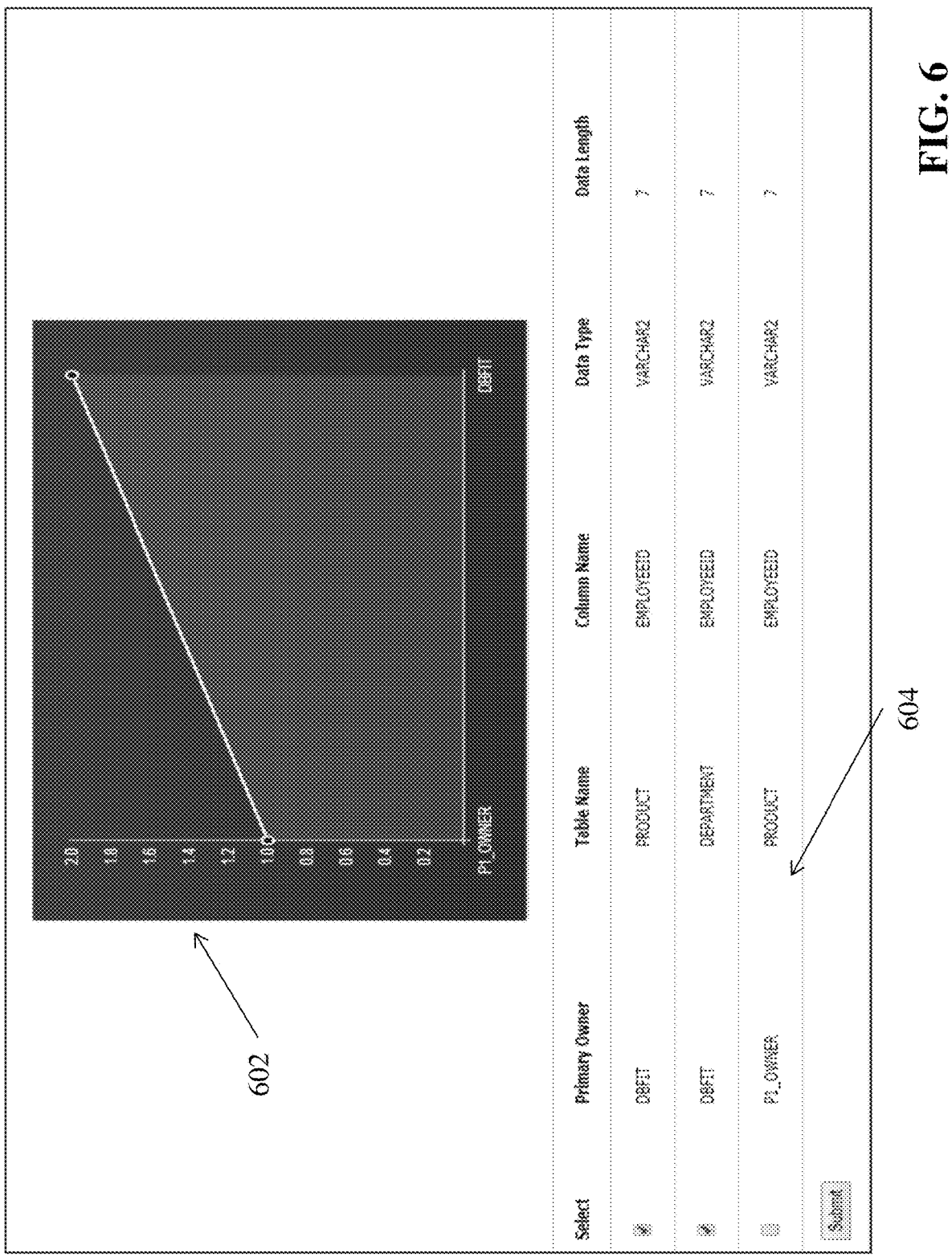
FIG. 6 is a diagram of an exemplary data visualization user interface generated by the UI module of application server computing device.

FIG. 6 is a diagram of an exemplary data visualization user interface generated by the UI module 406a of application server computing device 406. The user interface of FIG. 6 shows a graph 602 and a table listing metadata from a database schema relating to the EmployeeID column in the Product and Department tables in different database schema (e.g., DBFIT, P1_OWNER). As shown in FIG. 6, the EmployeeID column has a data type of VARCHAR2. As indicated previously with respect to FIGS. 1-3, the EmployeeID column is in the Employee table with a data length of 7, but has a foreign key relationship to a column in the Product table whose data length is 5. As described above, the methods and systems described herein change the data length value of the EmployeeID column in the Product table (and in other related tables, such as the Department table) so that the data length in those tables matches the data length in the Employee table. The graph 602 in FIG. 6 shows a numeric value for each database schema relating to the number of discrepancies discovered. For example, because the P1_OWNER schema only has one instance of the EmployeeID column (i.e., in the Product table), then the graph 602 depicts a value of 1.0 for the P1_OWNER schema. Similarly, because the DBFIT schema has two instances of the EmployeeID column (i.e., in the Product and the Department tables), the graph 602 depicts a value of 2.0 for the DBFIT schema. Therefore, the methods and systems described herein provide a dynamic and easy-to-understand visualization of where discrepancies between data type/data length occur across tables in a database schema.

As a result, the techniques described herein provide the technical improvement of automatically monitoring primary key-foreign key relationships for referential integrity by analyzing database schema and data contained in the respective columns of database tables, identifying discrepancies, and ameliorating such discrepancies through programmatic execution of procedure calls and queries against the production databases. Such a technical improvement goes beyond the functionality of current database systems, that typically enforce referential integrity only by data content (e.g., are the actual values consistent between the two columns?) instead of also analyzing column metadata such as data type and data length for consistency. This improvement provides many technical benefits to computerized database software and systems, including reduction of database errors and increased database availability by preventing unexpected system failure.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for enforcing referential integrity of database columns across a plurality of tables in a database, the system comprising:
    a server computing device including a memory for storing programmatic instructions and a processor for executing the programmatic instructions, and
    a plurality of databases coupled to the server computing device,
    the processor of the server computing device executing the programmatic instructions to:
        periodically capture a database schema associated with each database in the plurality of databases, the database schema comprising one or more relationships between a primary key column in a first table in the database and a foreign key column in a second table in the database, wherein each of the primary key column in the first table and the foreign key column in the second table have been populated with data;
        for each database schema:
            execute a first procedure call against the database schema to determine a discrepancy between the primary key column and the foreign key column with respect to one or more of: a data length value or a data type value, the first procedure call recording a numeric value corresponding to a number of discrepancies determined during execution of the first procedure call;
            execute a database query against the first table to retrieve a count of values in the primary key column that (i) have a data length value that is greater than a data length value of the foreign key column in the second table and (ii) have a data type value that is different from a data type value of the foreign key column in the second table;
            execute one or more database queries against the second table to insert test values into the foreign key column, wherein at least a first one of the test values has a data length value that is greater than a data length value of the foreign key column in the second table and at least a second one of the test values has a data type value that is different from a data type value of the foreign key column in the second table; and
            execute a second procedure call against the database schema to eliminate the discrepancy, wherein the second procedure call changes one or more of: (i) the data length value of the primary key column, (ii) the data length value of the foreign key column, (iii) the data type value of the primary key column, or (iv) the data type value of the foreign key column,
            wherein after the second procedure call finishes, the data length value of the primary key column matches the data length value of the foreign key column, and the data type value of the primary key column matches the data type value of the foreign key column;
        generate a visual representation of the changed database schema resulting from the second procedure call against each database in the plurality of databases, the visual representation including a graph comparing the numeric values corresponding to the number of discrepancies determined during execution of the first procedure call against each database in the plurality of databases; and
        display the visual representation on a remote device.

2. The system of claim 1, wherein upon execution of the first procedure call, the server computing device determines that the data length value of the primary key column is less than the data length value of the foreign key column.

3. The system of claim 1, wherein upon execution of the first procedure call, the server computing device determines that the data length value of the primary key column is greater than the data length value of the foreign key column.

4. The system of claim 1, wherein upon execution of the first procedure call, the server computing device determines that the data type value of the primary key column is different from the data type value of the foreign key column.

5. The system of claim 1, wherein the server computing device executes the one or more database queries to insert temporary data in one or more of: the first table or the second table.

6. The system of claim 5, wherein a data length value of the temporary data is greater than the data length value of one or more of: the data length value of the primary key column or the data length value of the foreign key column.

7. The system of claim 6, wherein the database returns an insertion error to the server computing device after execution of the one or more database queries.

8. The system of claim 5, wherein a data type value of the temporary data is different from one or more of: the data type value of the primary key column or the data type value of the foreign key column.

9. The system of claim 8, wherein the database returns an insertion error to the server computing device after execution of the one or more database queries.

10. The system of claim 1, wherein the data length value of the primary key column is a string length value or a number length value.

11. The system of claim 1, wherein the data type value of the primary key column is a string or a number.

12. The system of claim 1, wherein the data length value of the foreign key column is a string length value or a number length value.

13. The system of claim 1, wherein the data type value of the foreign key column is a string or a number.

14. A computerized method of enforcing referential integrity of database columns across a plurality of tables in a database, the method comprising:
    periodically capturing, by a server computing device, a database schema associated with each database in a plurality of databases coupled to the server computing device, the database schema comprising one or more relationships between a primary key column in a first table in the database and a foreign key column in a second table in the database, wherein each of the primary key column in the first table and the foreign key column in the second table have been populated with data;
    for each database schema:

executing, by the server computing device, a first procedure call against the database schema to determine a discrepancy between the primary key column and the foreign key column with respect to one or more of: a data length value or a data type value, the first procedure call recording a numeric value corresponding to a number of discrepancies determined during execution of the first procedure call;

executing, by the server computing device, a database query against the first table to retrieve a count of values in the primary key column that (i) have a data length value that is greater than a data length value of the foreign key column in the second table and (ii) have a data type value that is different from a data type value of the foreign key column in the second table;

executing, by the server computing device, one or more database queries against the second table to insert test values into the foreign key column, wherein at least a first one of the test values has a data length value that is greater than a data length value of the foreign key column in the second table and at least a second one of the test values has a data type value that is different from a data type value of the foreign key column in the second table; and executing, by the server computing device, a second procedure call against the database schema to eliminate the discrepancy, wherein the second procedure call changes one or more of: (i) the data length value of the primary key column, (ii) the data length value of the foreign key column, (iii) the data type value of the primary key column, or (iv) the data type value of the foreign key column, wherein after the second procedure call finishes, the data length value of the primary key column matches the data length value of the foreign key column, and the data type value of the primary key column matches the data type value of the foreign key column;

generate a visual representation of the changed database schema resulting from the second procedure call against each database in the plurality of databases, the visual representation including a graph comparing the numeric values corresponding to the number of discrepancies determined during execution of the first procedure call against each database in the plurality of databases; and display the visual representation on a remote device.

15. The method of claim 14, wherein upon execution of the first procedure call, the server computing device determines that the data length value of the primary key column is less than the data length value of the foreign key column.

16. The method of claim 14, wherein upon execution of the first procedure call, the server computing device determines that the data length value of the primary key column is greater than the data length value of the foreign key column.

17. The method of claim 14, wherein upon execution of the first procedure call, the server computing device determines that the data type value of the primary key column is different from the data type value of the foreign key column.

18. The method of claim 14, wherein the server computing device executes the one or more database queries to insert temporary data in one or more of: the first table or the second table.

19. The method of claim 18, wherein a data length value of the temporary data is greater than the data length value of one or more of: the data length value of the primary key column or the data length value of the foreign key column.

20. The method of claim 19, wherein the database returns an insertion error to the server computing device after execution of the one or more database queries.

21. The method of claim 18, wherein a data type value of the temporary data is different from one or more of: the data type value of the primary key column or the data type value of the foreign key column.

22. The method of claim 19, wherein the database returns an insertion error to the server computing device after execution of the one or more database queries.

23. The method of claim 14, wherein the data length value of the primary key column is a string length value or a number length value.

24. The method of claim 14, wherein the data type value of the primary key column is a string or a number.

25. The method of claim 14, wherein the data length value of the foreign key column is a string length value or a number length value.

26. The method of claim 14, wherein the data type value of the foreign key column is a string or a number.

* * * * *